STEREOPHONIC SOUND REPRODUCING SYSTEM

Filed June 2, 1958 2 Sheets-Sheet 1

INVENTORS.
BENJAMIN B. BAUER
JOHN M. HOLLYWOOD
GEORGE P. MAERKLE
BY
Brumbaugh, Free, Graves & Donohue
their ATTORNEYS.

Dec. 8, 1964 B. B. BAUER ETAL 3,160,706

STEREOPHONIC SOUND REPRODUCING SYSTEM

Filed June 2, 1958 2 Sheets-Sheet 2

INVENTORS.
BENJAMIN B. BAUER
JOHN M. HOLLYWOOD
BY GEORGE P. MAERKLE

Brumbaugh, Free, Graves & Donohue
their ATTORNEYS.

3,160,706
STEREOPHONIC SOUND REPRODUCING SYSTEM

Benjamin B. Bauer, Stamford, and John M. Hollywood, Greenwich, Conn., and George P. Maerkle, Huntington, N.Y., assignors to Columbia Broadcasting System, Inc., New York, N.Y., a corporation of New York Filed June 2, 1958, Ser. No. 739,048
2 Claims. (Cl. 179—1)

This invention relates to systems for reproducing stereophonic sound signals and, more particularly, to a new and improved system for reproducing signals from a stereophonic record in a highly efficient manner.

In recording on a record disc stereophonic sound signals received at two spaced locations, for example, it is customary to modulate the disc groove in two perpendicular directions in accordance with two different functions of the stereophonic signals. Thus, the disc groove may be modulated laterally according to the sum of the signals and vertically to represent the difference between the signals. In another method of modulation, the groove is cut on one side at 45° to the vertical in response to the signal from one of the two spaced locations and at 45° on the other side to represent the other stereophonic signal. These modulations may be amplified and reproduced directly or analyzed into their lateral and vertical components during reproduction to represent the sum and difference of the stereophonic signals.

In order to prevent excessive vertical modulation which can cause poor tracking in a non-stereophonic reproducer, the amplitude of a signal representing the difference between two stereophonic signals is frequently limited to a fraction of that of the sum signal. Customarily, however, in reproducing information recorded in this manner, each of the two stereophonic information signals is reproduced in a separate amplifying system and applied to one of two spaced loud speakers for binaural sound reproduction.

It is an object of this invention, therefore, to provide a stereophonic sound reproducing system utilizing a single amplifying network to reproduce both stereophonic signals.

Another object of the invention is to provide a new and improved amplifier accomplishing stereophonic signal reproduction in a highly efficient manner.

These and other objects of the invention are attained by connecting two amplifiers in push-pull and driving one of the amplifiers in one direction in response to one of the stereophonic signals and the other amplifier in the opposite direction in accordance with the other stereophonic signal. An inductive load connected between the two amplifiers generates a signal representing the sum of the stereophonic signals, the difference signal being reproduced by variations in the average potential of the inductive load. Addition and subtraction of the sum and difference signals reproduces the two stereophonic signals which are applied to two spaced loud speakers.

In one embodiment of the invention, a signal detected in response to lateral modulation of a record groove representing the sum of the stereophonic signals is applied to the primary winding of a transformer, the opposite ends of the secondary winding being coupled to the control grids of the two amplifiers. In accordance with the difference between the two stereophonic signals, the vertical modulation signal controls the average potential of the secondary winding thus changing the operating level of the two amplifiers in response to variations in the difference between two signals. Another embodiment of the invention utilizes a phase-splitter to apply the sum signal in opposite phase relation to the two amplifier grids, the difference signal being applied to the cathode electrodes. A further embodiment of the invention detects the two stereophonic signals directly and transmits them to the two control grids of the push-pull amplifier.

Further objects and advantages of the invention will be apparent from a reading of the following description in conjunction with the accompanying drawings in which.

Figures 1, 4, 5:
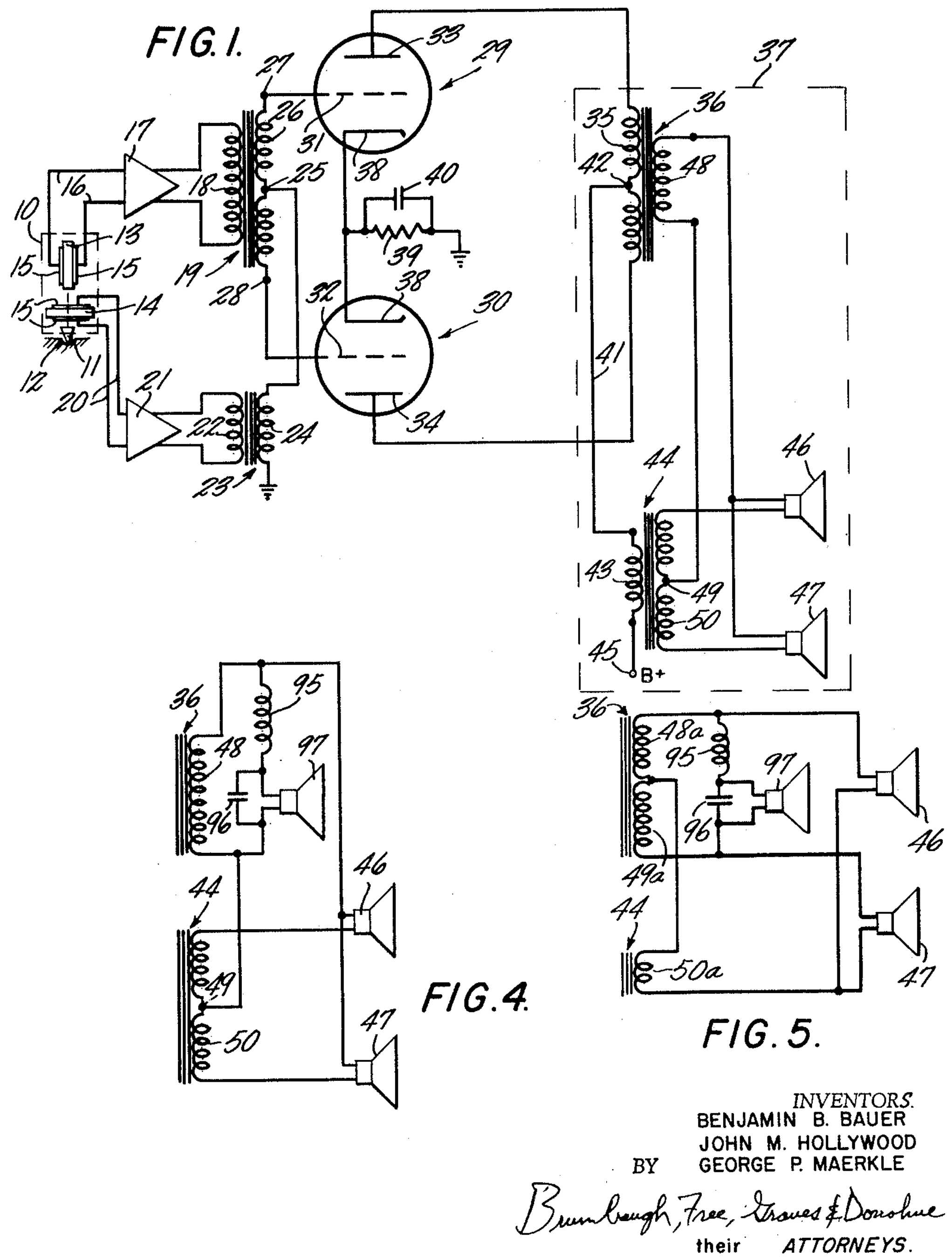
FIG. 1 illustrates a typical stereophonic sound reproducing system arranged according to the invention.
FIG. 4 shows a modified loud speaker system adapted for use with the invention.
FIG. 5 illustrates another form of loud sepaker system utilized with the invention.

In the embodiment illustrated in FIG. 1, a stereophonic transducer 10 operated by a stylus 11 responds to the lateral and vertical modulations of a stereophonic record groove 12 which represent the sum and difference, respectively, of the recorded stereophonic signals. Linked to the stylus 11 in any conventional manner, two piezoelectric elements 13 and 14 of the usual type generate voltage signals in accordance with the lateral and vertical modulations, respectively, which are detected by electrodes 15 mounted on opposite sides of each element. Carried by two conductors 16, the lateral groove modulation signal, which represents the sum of the recorded stereophonic signals, is amplified by a conventional amplifier 17 and impressed across the primary winding 18 of a transformer 19.

From the piezoelectric element 14, the difference signal, which may represent a relatively small fraction of the original difference between the stereophonic signals as compared with the sum signal, is carried by a pair of conductors 20 through an amplifier 21 to the primary winding 22 of another transformer 23. The secondary winding 24 of this transformer is connected between ground and a center tap 25 on the secondary winding 26 of the sum signal transformer 19, and thus varies the average potential of the winding 26 with respect to ground according to the difference between the stereophonic signals. At the same time, the signal representing the sum of the stereophonic signals drives the ends of the winding 26 in opposite directions according to the variations in the sum signal, thereby generating voltage signals corresponding to the two stereophonic signals at two terminals 27 and 28 to which the opposite ends of the winding 26 are joined.

In order to amplify these sterephonic signals, two triodes 29 and 30 have their grid electrodes 31 and 32 linked to the terminals 27 and 28, respectively, and their plate electrodes 33 and 34 connected to opposite ends of the primary winding 35 of an output transformer 36 which is included within a reproducing network 37. In this manner, the triodes 29 and 30 operate as a push-pull amplifier of class A, AB or AB′ insofar as the sum signal is concerned. Also, both the amplifiers 29 and 30 have their coupled cathode electrodes 38 connected to ground through a parallel resistor 39 and capacitor 40, the values of these elements being selected to bias the cathode electrodes 38 so that the desired mode of operation, be it A, AB, or AB′, is obtained. If the difference signal is about equal in magnitude to the sum signal then class A operation would be employed, while if the difference signal is small compared to the sum signal, then AB-type operation might be favored. Inasmuch as the current in a line 41 connected between a B+ terminal 45 and a center tap 42 of the winding 35 varies with the average potential of the winding 26, the voltage drop across a primary winding 43 of another transformer 44 inserted in the line 41 is proportional to the difference signal.

Stereophonic sound is generated in the network 37 by driving one of two spaced loud speakers 46 and 47 with the sum and difference signals from the transformers 36 and 44 combined in opposed relation and the other loud speaker with these signals combined in direct relation. To this end, the secondary winding 48 of the transformer 36 is linked at one end to both loud speakers and at the other end to a center tap 49 of the secondary winding 50 of the transformer 44. Each end of the winding 50 is connected to one of the loud speakers 46 and 47, the windings being selected so that the required addition and subtraction of the sum and difference signals is produced. As an alternative the tapped winding may be provided as the secondary of the transformer 36 and a conventional winding for the secondary of the transformer 44, with equally satisfactory results.

In operation, this embodiment of the invention detects lateral and vertical modulations representing the sum and difference of the stereophonic signals at the transducer 10 and transmits them to the primary windings of the transformers 19 and 23, respectively. Output signals from the secondary winding of the transformer 23 control the average potential of the second winding 26 through its center tap 25, thereby regulating the operating level of the triodes 29 and 30. In addition, the sum signal is induced between the opposite ends of this winding by the signals impressed on the primary coil 18. Inasmuch as the triodes 29 and 30 are connected in push-pull fashion, the amplifier has sufficient range to handle the oppositely directed sum signals from each end of the winding 26 and at the same time transmit the difference signal which shifts the grid potential of the two triodes equally in the same direction by varying the potential at the center tap 25 with respect to ground.

Since the difference signal usually need not be transmitted with the same fidelity as the sum signal for a given stereophonic impression, the transformer 44 need not be of the same quality as the transformer 36. Hence, only one high quality transformer is required and this provides considerable economy over the cost of two separate high quality amplifiers.

The amplified sum signal impressed across the primary winding 35 generates an output signal at the secondary winding 48 while the difference signal represented by the potential at the center tap 42 is generated at the secondary winding 50 of the transformer 44. Addition of the sum signal and the difference signal from one portion of the secondary winding 50 transmits a signal to one of the two loud speakers 46 and 47 representing one of the two stereophonic signals, while subtraction of the difference signal in the other portion of the winding 50 from the sum signal produces the remaining stereophonic signal at the other loud speaker.

Figure 2:
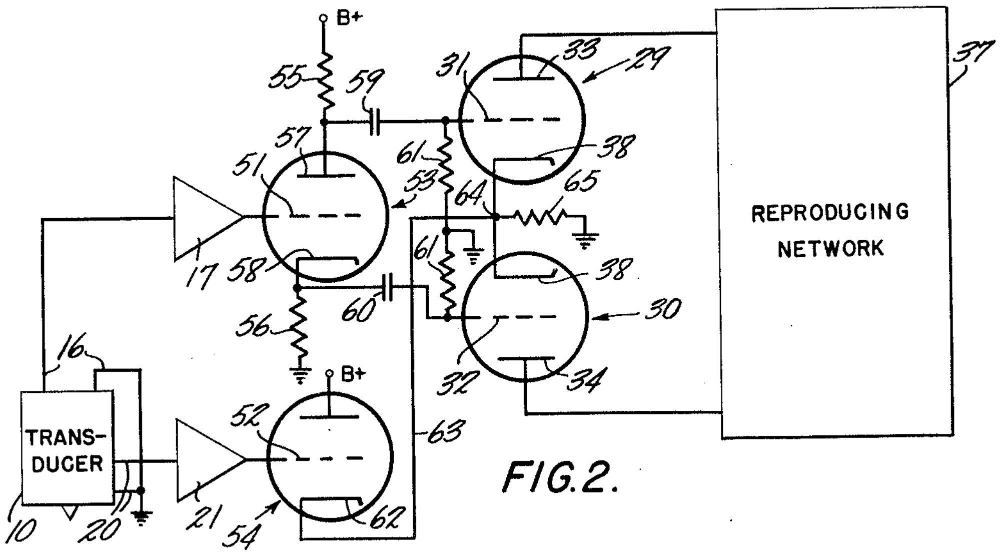
FIG. 2 shows another embodiment of the invention utilizing phase-splitting.

In the embodiment of the invention illustrated in FIG. 2, one of each of the pairs of conductors 16 and 20 from the transducer 10 is grounded and the amplified sum and difference signals from the amplifiers 17 and 21 are applied directly to the grid electrodes 51 and 52 of two triodes 53 and 54, respectively. Two identical resistors 55 and 56 connect the plate electrode 57 and the cathode electrode 58 of the triode 53 to a positive voltage source and ground, respectively, thereby adapting this triode for phase-splitting operation. Thus, signals of equal magnitude and opposite phase, each representing the sum of the stereophonic signals, are generated at the plate and cathode electrodes 57 and 58 and carried through coupling capacitors 59 and 60 to the grid electrodes 31 and 32 of the amplifiers 29 and 30, both these electrodes being connected to ground through identical grid bias resistors 61.

In order to regulate the operating level of the triodes 29 and 30 in accordance with variations in the difference signal, the cathode electrode 62 of the amplifier 54, which operates in conventional cathode follower fashion, is connected by a line 63 to the junction 64 of the coupled cathodes 38. This junction is also connected to ground through a resistor 65 which acts as a load for the cathode follower and is selected to provide proper cathode bias for the triodes 29 and 30. Amplified stereophonic signals generated at the plate electrodes 33 and 34 are transmitted to two spaced loud speakers by the reproducing network 37 which may be arranged in the same manner as that described with respect to the embodiment shown in FIG. 1. The operation of this embodiment of the invention is essentially the same as that previously described except that the grid electrodes 31 and 32 are driven in opposite directions in accordance with the sum signal by the phase-splitter 53 while the potential of the cathode electrodes 38 is varied according to the difference signal.

Many types of stereophonic phonograph transducers are arranged to generate voltage signals representing the two stereophonic signals rather than their sum and difference. Inasmuch as the input signals to the grid electrodes of the two amplifiers arranged in push-pull according to the invention correspond to the two stereophonic signals, it is readily apparent that the output signals generated by such transducers may be amplified and applied directly to these grid electrodes. Accordingly, the embodiment of the invention illustrated in FIG. 4, comprises a typical 45°–45° transducer 66 wherein two piezoelectric elements 67 and 68 respond to two modulation channels cut at 45° angles into opposite sides of a record groove.

One of the electrodes mounted on each of the elements 67 and 68 transmits a voltage signal representing the corresponding stereophonic signal and these signals are transmitted through conductors 69 and 70 to the grid electrodes 71 and 72 of two conventional amplifiers 73 and 74, respectively, the remaining electrode of each piezoelectric element being grounded. Amplified signals from the plate electrodes 75 and 76 of these emplifiers are carried through coupling capacitors 77 and 78 to the grid electrodes 31 and 32 of the two push-pull triodes 29 and 30, respectively. These triodes are arranged in substantially the same manner as in the embodiment shown in FIG. 1, the grid electrodes 31 and 32 in this case being connected to ground by grid-biasing resistors 79 and 80.

As in the previously described embodiments of the invention, the amplified stereophonic signals are impressed across the primary coil 81 of a transformer 82, the difference between these signals being detected by a center tap 83 and applied to the primary coil 84 of another transformer 85. In this embodiment of the invention each end of the secondary winding 86 of the transformer 82 is connected to one of the two loud speakers 46 and 47 and the secondary winding 87 of the transformer 85 is connected between a center tap 88 of the winding 86 and the other terminals of the two loud speakers, this point also being grounded. It will be readily apparent that the reproducing network illustrated in this embodiment of the invention is another arrangement for producing the required addition and subtraction of the sum and difference signals obtained by the network 37 shown in FIG. 1 and that either reproducing network may be utilized with any of the embodiments disclosed herein.

Figure 3:
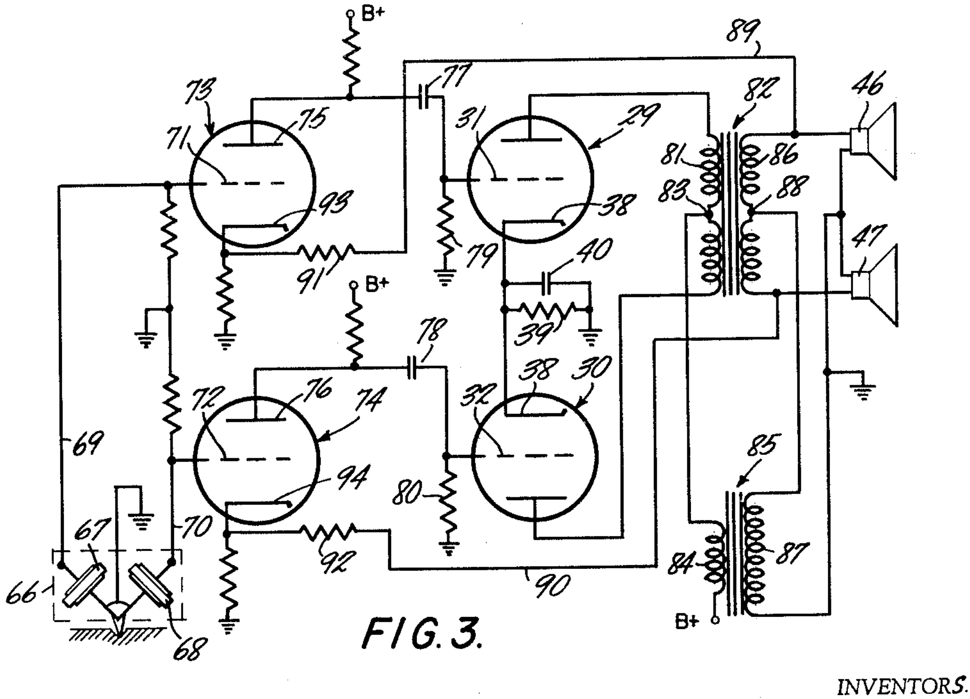
FIG. 3 illustrates a further embodiment of the invention adapted to amplify the stereophonic signals directly.

Inasmuch as the two stereophonic signals are generated separately by the transducer 66, the embodiment of the invention shown in FIG. 3 is especially adapted to utilize inverse feed-back to maintain separation between the two signal channels and reduce distortion. Thus, two conductors 89 and 90 are connected from the ungrounded terminals of the two loud speakers 46 and 47, respectively, through two resistors 91 and 92 to the cathode electrodes 93 and 94 of the corresponding amplifiers 73 and 74, respectively.

Another reproducing network arrangement is illustrated in FIG. 4 wherein the transformers 36 and 44 of FIG. 1 are connected to generate a single low frequency signal as well as two stereophonic high frequency signals. To this end the sum signal generated at the secondary winding 48 is applied through an electrical filter comprising a suitable inductance 95 and capacitor 96 connected in series across the winding 48 to a low frequency speaker 97. Thus, the low frequency portion of the stereophonic signals is reproduced in the single speaker 97 while the high frequency portions of the two signals are applied to the two speakers 46 and 47, thereby producing a highly efficient stereophonic effect. It will be understood that this arrangement may be utilized with any of the embodiments of the invention illustrated herein and that other similar arrangements can readily be devised to accomplish the same result. For example, as shown in FIG. 5, the low frequency loud speaker 97 may be connected across a center tapped secondary winding **48*a* of the transformer 36 which generates the sum signal, while a secondary winding 50*a* is connected between the center tap 49*a* of the winding 48*a* and both the loud speakers 46 and 47. Thus, the high frequency components of the left and right hand signals are generated by the addition and subtraction of the sum and difference signals in the windings 48*a* and 50*a* and are applied to high frequency speakers 46 and 47**.

Although the invention has been described herein with reference to specific embodiments, many modifications and variations therein will readily occur to those skilled in the art. As an example, the stereophonic signals to be amplified may be received directly or derived from other recording media such as magnetic tape, photographic film, and the like. Also, it will be apparent that suitable substitution of components may be made in the described embodiments, such as by replacing the vacuum tubes with appropriate transistors. Furthermore, while this invention has been described from the point of view of amplifying two sterophonic signals, it is evident that this amplifier means may be used to amplify any two independent signals. Accordingly, all such modifications and variations are included within the intended scope of the invention as defined by the folowing claims.

We claim:

1. Apparatus for reproducing stereophonic sound signals comprising amplifier means including a pair of amplifiers connected in push-pull, each having cathode electrode means, grid electrode means, and plate electrode means, first transformer means including primary winding means connected between the two plate electrode means generating a signal representing the sum of two stereophonic signals applied between the grid electrode and cathode electrode means of the two amplifiers, respectively, second transformer means including primary winding means connected between the first transformer primary winding means and a reference voltage point responsive to changes in the average potential of the first transformer primary winding means to generate a signal representing the difference between the two stereophonic signals, secondary winding means in the first and second transformer means connected to add the sum and difference signals and connected to a first loud speaker thereby reproducing one of the stereophonic signals, further secondary winding means in the first and second transformer means connected to subtract the sum and difference and connected to a second loud speaker thereby reproducing the other stereophonic signal, circuit means connected across said secondary winding means including filter means adapted to pass a selected portion of the frequency range of the two signals from said circuit means, and third loud speaker means connected to the filter means and responsive to the signal passed by the filter means.

2. Apparatus according to claim 1 wherein the filter means comprises a low pass filter which passes the low frequency portion of the signal range.

References Cited in the file of this patent

UNITED STATES PATENTS

| | | |
|---|---|---|
| 2,509,389 | Blake | May 30, 1950 |
| 2,742,568 | Mansson | Apr. 17, 1956 |
| 2,786,903 | Price | Mar. 26, 1957 |
| 2,845,491 | Bertram | July 29, 1958 |